US007642936B2

(12) United States Patent
Bales et al.

(10) Patent No.: US 7,642,936 B2
(45) Date of Patent: Jan. 5, 2010

(54) SYSTEM AND METHOD FOR DETERMINING WHETHER TO DYNAMICALLY SUPPRESS DATA IN A COMMUNICATIONS ENVIRONMENT

(75) Inventors: Scott A. Bales, Durham, NC (US); Frank G. Bordonaro, Cary, NC (US); John P. Fussell, Raleigh, NC (US); Paul A. Schmidt, Cary, NC (US); Uwe Sellentin, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 11/136,187

(22) Filed: May 24, 2005

(65) Prior Publication Data

US 2006/0268761 A1 Nov. 30, 2006

(51) Int. Cl.
*H03M 7/30* (2006.01)
*H04L 12/28* (2006.01)
(52) U.S. Cl. .......................................... 341/87; 370/394
(58) Field of Classification Search ............ 370/395.52, 370/394; 455/561
See application file for complete search history.

(56) References Cited

U.S. PATENT DOCUMENTS

| 5,600,316 | A | * | 2/1997 | Moll | 341/87 |
|---|---|---|---|---|---|
| 5,687,184 | A | * | 11/1997 | Lorenz et al. | 714/704 |
| 5,742,351 | A | * | 4/1998 | Guede | 348/459 |
| 5,781,593 | A | * | 7/1998 | Petch et al. | 375/354 |
| 5,894,557 | A | | 4/1999 | Bade et al. | 395/200.58 |
| 6,038,231 | A | * | 3/2000 | Dolby et al. | 370/394 |
| 6,134,245 | A | * | 10/2000 | Scarmalis | 370/474 |
| 6,188,912 | B1 | * | 2/2001 | Struhsaker et al. | 455/561 |
| 6,192,051 | B1 | | 2/2001 | Lipman et al. | 370/389 |
| 6,363,065 | B1 | | 3/2002 | Thornton et al. | 370/352 |
| 6,400,722 | B1 | | 6/2002 | Chuah et al. | 370/401 |
| 6,477,595 | B1 | | 11/2002 | Cohen et al. | 710/105 |
| 6,512,754 | B2 | | 1/2003 | Feder et al. | 370/338 |
| 6,512,773 | B1 | * | 1/2003 | Scott | 370/395.61 |
| 2001/0031646 | A1 | * | 10/2001 | Williams | 455/560 |
| 2004/0131051 | A1 | * | 7/2004 | Rabipour et al. | 370/352 |
| 2004/0190548 | A1 | * | 9/2004 | Harel et al. | 370/466 |
| 2005/0005196 | A1 | * | 1/2005 | Bune | 714/18 |
| 2005/0286536 | A1 | * | 12/2005 | Steinheider et al. | 370/395.52 |
| 2007/0165631 | A1 | * | 7/2007 | Horton et al. | 370/389 |

* cited by examiner

*Primary Examiner*—Patrick N. Edouard
*Assistant Examiner*—Huy C Ho
(74) *Attorney, Agent, or Firm*—Baker Botts L.L.P.

(57) ABSTRACT

A method for communicating data is provided that includes receiving a plurality of bits associated with a communications flow and inspecting the bits. The method also includes determining whether one or more samples included in the flow should be suppressed. A portion of the bits is converted to 1 bits such that they are designated for later suppression. A selected one or more of the samples are suppressed if the selected samples are designated for suppression.

25 Claims, 3 Drawing Sheets

SYSTEM AND METHOD FOR DETERMINING WHETHER TO DYNAMICALLY SUPPRESS DATA IN A COMMUNICATIONS ENVIRONMENT

TECHNICAL FIELD OF THE INVENTION

The present invention relates in general to the field of communications and, more particularly, to a system and a method for determining whether to dynamically suppress data in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve a system benefit per-unit of cost.

Compression techniques can be used by network operators to produce high percentages of bandwidth savings. In certain scenarios, network operators may consider compressing common communication patterns that appear on a given communication link. However, many of the existing compression/suppression protocols are deficient because they are static, unresponsive, and rigid. Moreover, many such systems add overhead to the system, while not yielding a sufficient offsetting bandwidth gain. Accordingly, the ability to provide a communications system that consumes few resources, optimizes bandwidth, and achieves minimal delay presents a significant challenge for network operators, service providers, and system administrators.

SUMMARY OF THE INVENTION

From the foregoing, it may be appreciated by those skilled in the art that a need has arisen for an improved suppression approach that optimizes data exchanges in a communications environment. In accordance with one embodiment of the present invention, a system and a method for determining whether to dynamically suppress data are provided that substantially eliminate or greatly reduce disadvantages and problems associated with conventional compression/suppression techniques.

According to one embodiment of the present invention, a method for communicating data is provided that includes receiving a plurality of bits associated with a communications flow and inspecting the bits. The method also includes determining whether one or more samples included in the flow should be suppressed. A portion of the bits is converted to 1 bits such that they are designated for later suppression. A selected one or more of the samples are suppressed if the selected samples are designated for suppression.

Certain embodiments of the present invention may provide a number of technical advantages. For example, according to one embodiment of the present invention, a communications approach is provided that enhances bandwidth parameters for a given architecture. This is a result of the suppression scheme, which yields bandwidth gains by recognizing repetitious patterns. A given input bit stream may be identified as a candidate for suppression by the compression determination module. The compression determination module may inspect control bits of particular frames in order to decide which bits should be compressed. Subsequently, the bit pattern is not transmitted over the backhaul, whereby the suppressed data can be simply played out or restored on the other end of the link.

Furthermore, the bandwidth savings can be produced without any increase in the complexity of multiplexing and demultiplexing schemes. Additionally, such a compression upgrade or enhancement may be provided to an existing system with minimal effort. A simple algorithm may be used in conjunction with hardware (e.g. a field programmable gate array (FPGA)) to leverage infrastructure already in place. Thus, a complete system overhaul is not necessary. Such advantages may be particularly beneficial to service providers, as effective compression protocols significantly reduce their operating expenditures and minimal overhead is incurred in implementing such a scheme.

Note also that such an enhancement is flexible in that it can be extended to include a multitude of compressible, common, repetitive patterns. Thus, such a solution can be easily extended to signaling and packet data channels. This further allows such a configuration to accommodate a wide range of incoming flows, as it may be extended to a number of different types of traffic arrangements. Additionally, minimal overhead is incurred as a result of the operations of the present invention.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
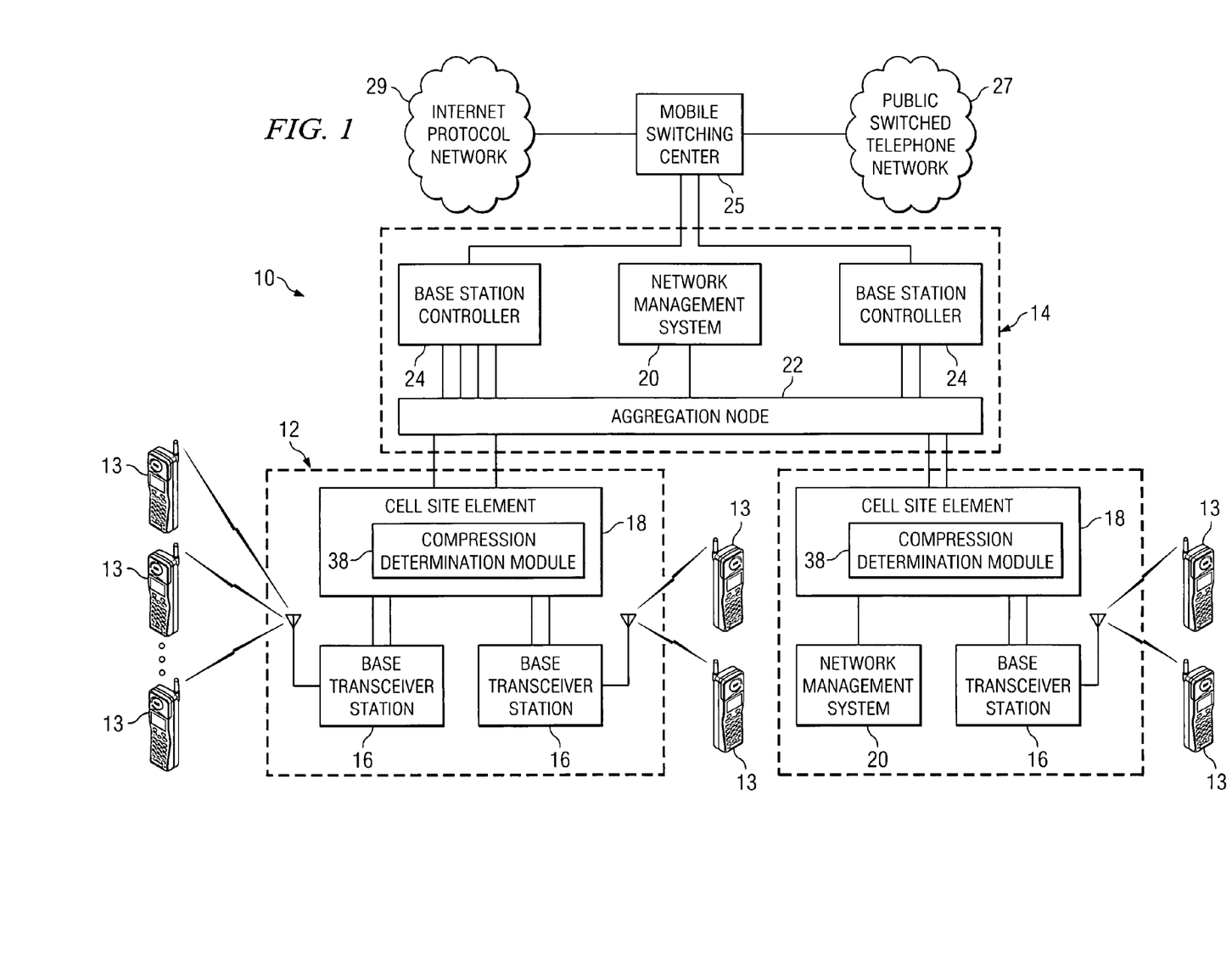
FIG. 1 is a simplified block diagram of a communication system for dynamically suppressing data in a network environment.

FIG. 1 is a simplified block diagram of a communication system 10 for suppressing data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Each cell site element 18 may include a compression determination module 38. In other embodiments, a reciprocal function may be provided in aggregation node 22, as explained more fully below.

Note the communications links extending between cell site element 18 and aggregation node 22, as compared to the number of communication links extending between cell site element 18 and base transceiver stations 16. This arrangement has been provided in order to illustrate that without the present invention, the number of communication links between cell site 12 and central office site 14 would be equal to the output of base transceiver stations 16. By implementing the suppression techniques of the present invention (and as explained in detail below), a reduction in communication links between cell site 12 and central office site 14 is achieved. If nothing else, the present invention may provide additional availability (for use) of the existing lines.

Communication system 10 may generally be configured or arranged to represent 2.5 G architecture applicable to a Global System for Mobile (GSM) environment in accordance with a particular embodiment of the present invention. However, the 2.5 G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3 G network, where 3 G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

As illustrated in FIG. 1, in a GSM network, a backhaul network exists between a BTS and a BSC. The backhaul can be used to transmit voice conversations, data, and control information using various standards and proprietary vendor specific formats. In order to address operational expenses, a backhaul optimization scheme is desired that will provide significant bandwidth savings, while maintaining low latency and end-to-end transmissions for all possible frame types.

In accordance with the teachings of the present invention, compression determination module 38 converts silence bits to 1 bits for the purposes of compressing them out at a later time. This avoids transmission of this somewhat meaningless silence data across the backhaul. This data can simply be restored or regenerated at the other end, as aggregation node 22 will see a series of 1 bits that represent silence information. Compression determination module 38 is performing its operations in real-time (or at least close to real-time), as it makes decisions about which incoming data streams are candidates for compression/suppression. Then IOS gets "tricked" into believing that the forthcoming information is the actual data, which was just on the inbound wire. Compression determination module 38 may be provided in hardware, as IOS and software may not be fast enough to perform these operations. Hardware can reduce latency in this example implementation of FIG. 1.

In one embodiment, compression determination module 38 is a field programmable gate array (FPGA). Alternatively, such suppression decisions, operations, and techniques may be executed by any suitable component, device, application specific integrated circuit (ASIC), software, processor, algorithm, erasable programmable read only memory (EPROM), electrically erasable programmable ROM (EEPROM), or any other suitable object that is operable to facilitate such operations. Considerable flexibility is provided by the structure of compression determination module 38. It can also be easily appreciated that such a function could be provided external to cell site element 18. In such cases, such a functionality could readily be embodied in a separate component, element, or device.

Compression determination module 38 allows communication system 10 to suppress unused, idle, and redundant information in offering an optimal solution for the backhaul network. This can be achieved by dynamically detecting and suppressing repeating bit patterns embedded in subsequent 8 Kbps sub-rate frames and then recreating the suppressed data at the far end of the communications link. These operations can be performed regardless of the frame format and the sub-rate width being employed at any given time. Note that dynamic suppression element 60 may perform suppression regardless of the frame format, but the compression determination module 38 does not necessarily need to perform framing on various subrates. It can do this simultaneously on all subchannels without affecting the data stream.

Thus, an incoming bit pattern may be evaluated to determine whether it can be suppressed. A bit pattern can be played out or restored on the opposite end of the communication link to mimic the data in cases where the frame is designated for suppression. The restoration function includes suitable ordering and timing operations. This recognition (of prevalent streams) would allow the greatest savings for any compression operation. In cases where the incoming pattern is not a candidate for suppression, the entire bit pattern could then be sent, as the architecture would be unable to suppress all of the diverse bit patterns in a given backhaul with fewer bits. A demultiplexer, which can be suitably positioned downstream, may then simply perform a series of reverse operations in identifying the suppressed information and playing out the data.

Preprocessing of the input bits can be done such that the samples being considered for suppression are not necessarily consecutive bits from the input stream, but can be selected such that they are most likely to be suppressible. Hence, the present invention provides for the reordering of input bits, the selection of samples from the reordered bit stream, and the restoration of proper bit ordering.

Using such a protocol, communication system 10 provides a simplistic solution for reducing compression and decompression operations. In addition to creating minimal overhead and being easy to implement (with potential modifications only being made to aggregation node 22 and cell site element 18), such an approach could cooperate with any suitable compression protocol or arrangement. The enhancement in transmission can be provided in both aggregation node 22 and cell site element 18, as the present invention bi-directional.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique (i.e. cannot be recreated at aggregation node 22). Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between base transceiver station 16 and base station controller 24.

Turning to the infrastructure of FIG. 1, mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, various traffic protocols (e.g. time division multiplexed (TDM), GSM 8.60, GSM 8.61, high level data link control (HDLC), asynchronous transfer mode (ATM), point to point protocol (PPP) over HDLC, TRAU, vendor-specific formats, etc.) may be used and communicated by each base transceiver station 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

Figure 2:
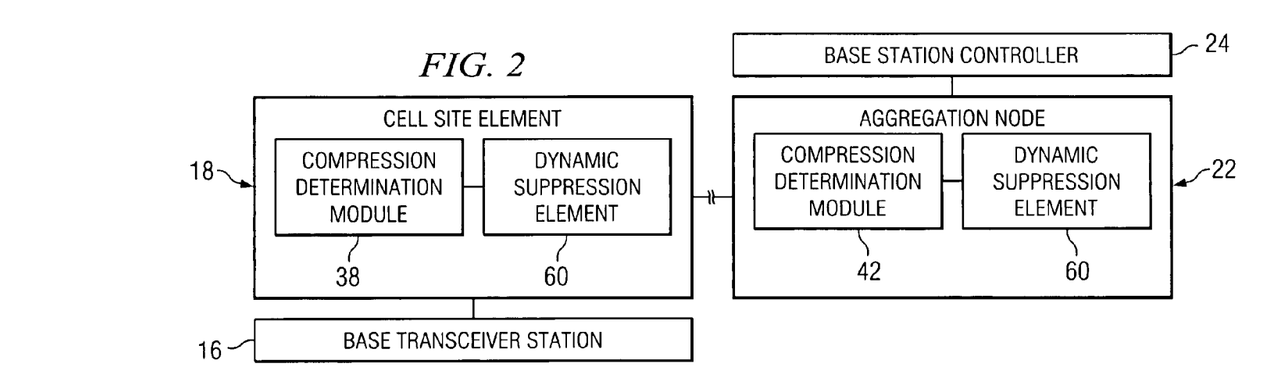
FIG. 2 is a block diagram of an example internal structure associated with a cell site element and/or an aggregation node of the communication system.

FIG. 2 is a simplified block diagram of an example internal structure of cell site element 18 and aggregation node 22, both of which include a dynamic suppression element 60 and compression determination modules 38 and 42. In one embodiment, dynamic suppression element 60 is an algorithm (potentially included in appropriate software) that achieves the suppressing operations as described herein. Dynamic suppression element 60 and compression determination modules 38 and 42 may be suitably coupled to each other, and thereby interface, in any appropriate fashion.

Note that compression determination module 38 can reside in cell site element only, or in both cell site element and aggregation node 22. In one embodiment, compression determination module 38 can be implemented on the "sending side" of the architecture to provide the operations as described herein. In other embodiments, compression determination module 38 could also be placed on the "receiving side" of the architecture, as evidenced by a complimentary compression determination module 42, which is provided in aggregation node 22. However, in most scenarios compression determination module 38 has little functionality on the receiving side. Once the bits are converted to "ones" on the sending side, they generally cannot be changed back to anything else.

As can be appreciated, when the E1 frames come in from the wire, they are normally in a DS0 format. Compression determination module 38 is operable to divide the bits and then position the bits into the 16 kilo-bit samples. From this point, the IOS can then receive the samples and perform any number of comparison operations.

Note that where the frames begin or end in IOS is generally unknown. This would preclude the system from performing suppression for certain data (e.g. in silence frames). In certain frames types, silence frames can be identified. Such identifications are generally in accord with the 8.60 and 8.61 specifications. For example, in a full-rate frame or in an enhanced full-rate (EFR) frame, certain bits (e.g. silence descriptor bits) are used to identify the frame type.

In accordance with the teachings of the present invention, as the frames are coming in, compression determination module 38 can line-up bits into 16-bit registers such that they can be sent to IOS for compression operations to be performed. In addition to this task, compression determination module 38 can frame these bits as they arrive. Aside from transparently setting up the bits, compression determination module 38 can copy the bits and then evaluate the individual sub-rates. Thus, instead of evaluating single 8 kilo-bit sub-rates, these will be in pairs such that compression determination module 38 can evaluate sub-rates 0, 1 and then sub-rates 2, 3 and then sub-rates 4, 5. These two bits combined make up a 16 kilo-bit sub-rate.

These bits can then be assembled into a register. Once the bits are in the 16 kilo-bit register, compression determination module 38 can analyze this information and identify framing information for the 16 kilo-bit frame. In this scenario, compression determination module 38 may view the control bits in these frames. In particular, control bits 1-5 identify frame type and control bits 12, 13, and 14 are silence and SID information.

This data passes through transparently, but compression determination module 38 can save or copy this information on the sending side of the architecture. Once compression determination module 38 detects that a complete frame has passed by (and the frame is in synchronization), then compression determination module 38 can begin to recognize the silence indicator bits in subsequent frames. For as long as synchronization is maintained, where a frame is received and includes silence bits that are set, then the corresponding channels are marked as inclusive of data bits that are unused. Once these data bits (1-260), which are in certain positions in the frame, are marked, in cases where there is a silence frame present, instead of transmitting the bit to IOS, a 1 bit is filled in. The result of this operation is that the compression algorithm (as outlined herein and provided within dynamic suppression element 60) can see the 1-bit entry and compress these frames without having to analyze the frame. Once synchronization is achieved, the framer would go through its normal protocol in identifying a bit error that signifies synchronization has been lost, and then the FPGA would revert back to transferring the raw bits.

When framing of the 16 kilo-bit channels is occurring, a check should be made to see whether there is an adjacent channel that is also performing framing operations in a similar fashion. In this example, the adjacent channel should be dealing with 16 kilo-bit segments, not 32 kilo-bit segments or 64 kilo-bit segments. Data could be corrupted in cases where an inconsistency exists.

The functional flow of communication system 10 may follow a bits in/bits out protocol, being dependent only on the received bit pattern. Input DS0s may be demultiplexed to create an appropriate number of sub-rate DS0s, each corresponding to a different call. (Note that some DS0s are not assigned to any call and still others are used for control information.) For each sub-rate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

The collected samples may be compared to a few pre-identified (or previously learned) patterns (e.g. the previously occurring input streams) and decisions may be made regarding which bits are to be suppressed with a corresponding header representing that the data has been suppressed. The receiving end may then perform reverse operations in accounting for the suppression in order to restore the bit stream and, potentially, to then communicate it to its intended next destination. Thus, a demultiplexer/decompressor (not shown) may perform tasks in reverse in order to undo what was done by the compressor and the multiplexer, which can be included within aggregation node 22 and/or cell site element 18.

TDM streams may be TDM multiplexed to generate appropriate DS0s, which are further combined with drop-and-insert DS0s to create T1/E1s. Based on the header of the overall multiplexed packet, appropriate line conditions or alarms may be generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one-bit errors.

It is critical to note that compression determination module 38 and dynamic suppression element 60 may be changed considerably, as they offer only one example suppression protocol configuration that accommodates any of the identified incoming bit patterns. Any number of alternative bit patterns may be readily accommodated by communication system 10 and are, therefore, included in the broad scope of its teachings. These common patterns may be based on particular communication needs or on the prevalence of commonly reoccurring bit patterns in a given communications architecture. Additionally, any attached header bits may also provide E1/T1 line conditions and alarms. In other embodiments, additional bits may be added to the header bits in order to provide any number of functions, such as control parameters, the state of the given communication link, the condition of the E1/T1 line, the condition of an alarm, or the identification of a certain packet. Thus, these extra bits may provide any suitable additional information that may be relevant to a communication session occurring in communication system 10. Additionally, dynamic suppression element 60 can be used to transport any TDM stream over IP. For example, some applications use TDMA and GSM on the same E1 (i.e. TDM on some timeslots, GSM on others). The present invention transports all such information over IP and restores the bit stream on the far end of TDM E1. For some TDMA applications, there is not a lot of suppression occurring, but the system is still functional.

Figure 3:
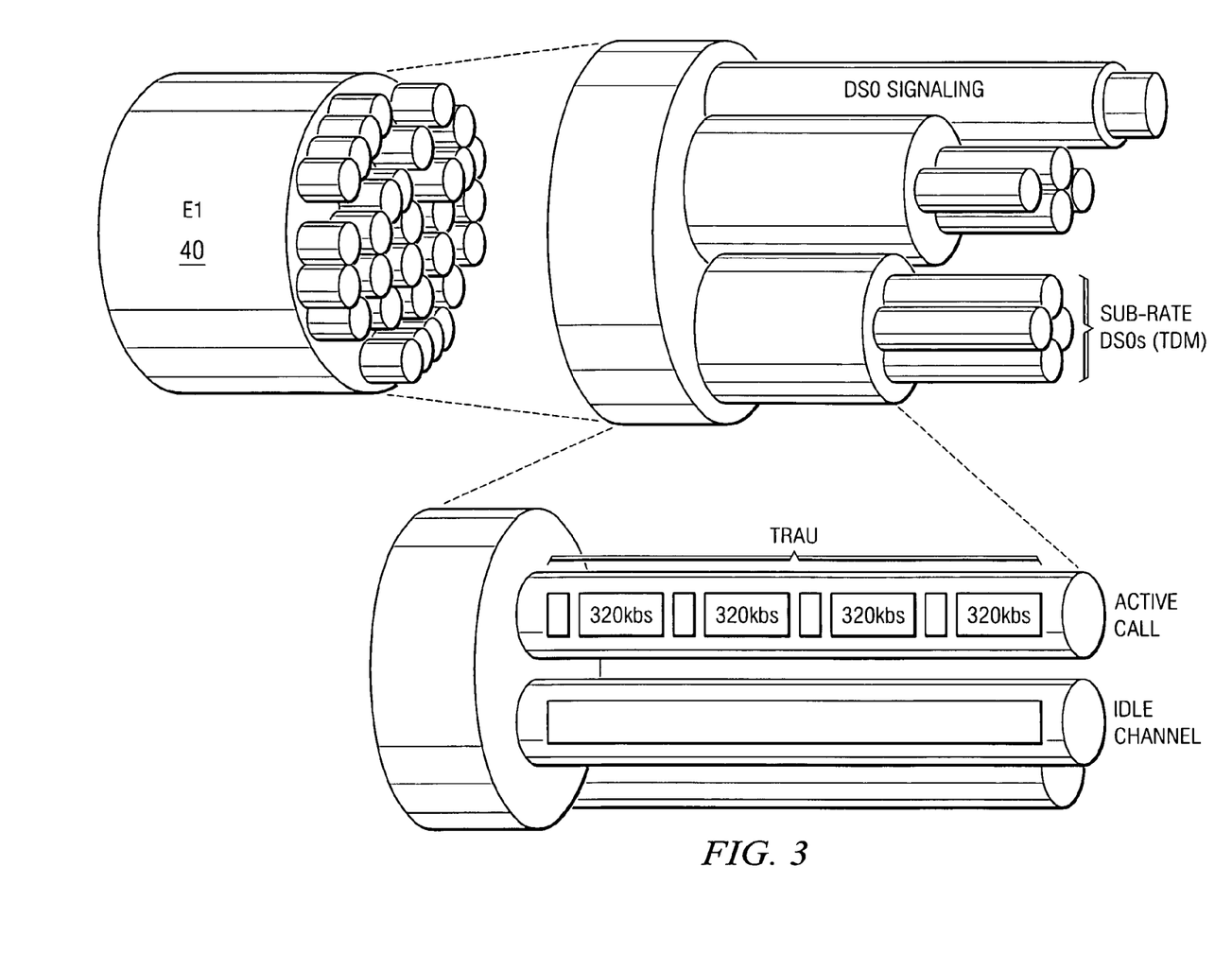
FIG. 3 is a simplified schematic diagram of an example GSM 8.60 format.

Before turning to FIG. 3, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein. In a similar vein, the terms "suppression" and "compression" are somewhat interchangeable. The two terms refer to operations that offer the ability to minimize data propagation along the backhaul. Both suppression and compression relate to abbreviating or eliminating certain portions of data segments, which are prevalent in the network.

As identified above, each of these elements may include software and/or an algorithm and/or an FPGA (e.g. provided in compression determination module 38 and/or dynamic suppression element 60) to effectuate suppression for voice or packet data applications as described herein. Alternatively, such suppression operations, decisions, and techniques may be achieved by any suitable hardware, component, device, ASIC, additional software, processor, algorithm, EPROM, EEPROM, or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, such a functionality could be readily embodied in a separate component, device, or module.

FIG. 3 is simplified block diagram of an example GSM 8.60 format E1 structure. In operation of an example embodiment, consider a case where an end user is having a conversation using a mobile station. Voice frames from a given mobile station are generally being generated every 20 milliseconds in such a scenario. In a typical environment, there are 320-bit frames that are sent directly behind each other. In a native environment, base transceiver station 16 receives this information and converts it into TRAU frames. There is control information that is exchanged (on another channel) between base transceiver station 16 and base station controller 24 (over an E1 link 40) that indicates which channel or which sub-rate that will be assigned for this call.

When a call comes up, these frames (which are primarily of a fixed length) are put into T1/E1 sub-rates, whereby a DS0 is eight bits. These eight bits can be further divided into sub-rates (an 8 kilobit sub-rate corresponds to a single bit, a 16 kilobit sub-rate corresponds to two bits, a 32 kilobit sub-rate corresponds to four bits, and a 64 kilobit sub-rate corresponds to the full DS0).

In a simple case, a call is on a 16 kilobit sub-rate channel and it will be assigned to a time slot (and assigned one sub-rate inside that time slot) for transmission over the E1. Every 125 microseconds, two bits of the frame are being sent across the E1. Base station controller 24 receives this information, assembles the frames, and then presents them to the TRAU.

In accordance with the operation of the present invention, the framing protocol that is used (e.g. 16 kilobit TRAU frames, half-rate calls, etc.) is used in processing. The present invention uses knowledge of the framing protocol to identify bits that can be changed to ones, and then they are later suppressed by the original algorithm. It is the original algorithm, which can ignore TRAU frames.

The algorithm of the present invention will universally divide the channel into 8-kilobit sub-rates. In this manner, synchronization is not being attempted; only the raw bits are being evaluated. The algorithm can begin to collect bits on an 8-kilobit sub-rate basis. For example, if a full E1 is present, then 31 time slots (each time slot having 8 sub-rates) are present that could have data. Hence, 248 eight-kilobit sub-rates could be active.

In this example embodiment, an FPGA could be employed to monitor the line and to separate the bits into 248 sub-rates. The FPGA can also collect a sample that contains 16 bits for each sub-rate (every two milliseconds). The FPGA can also perform demultiplexing operations. After the two-millisecond interval elapses, the FPGA then has 16 bits collected for each sub-rate. The FPGA can then send an interrupt signal to IOS with this new packet (i.e. the super-frame) that has information for each of the sub-rates. From IOS, there will be 3968 bits (plus header bits), which consists of 248 samples of 16 bits each.

Over a period of ten samples, that data would add up to approximately a frames worth of data. Recall that the frames are of a fixed length (e.g. 160 bits). The algorithm can now take these and forward them to the other end (i.e. the base station controller) such that they can be demultiplexed and regenerated. Coupled to this super-frame is a header, which can be a bit-mask (where there is one bit for each possible 16-bit sample). It should be noted that the bit mask is not always necessary (i.e. not included in the backhaul frame header). In order to compress the data, the IOS records and saves ten samples (in a row) and then compares the sample that is currently being evaluated with a sample that occurred ten samples ago. Stated differently, the algorithm compares the sample that it received for that sub-rate to the same sample that it received ten instances ago. Thus, the algorithm compares new bits to similar bits that would have been provided in the same bit position in a previous frame. The present invention capitalizes on the intrinsic nature of the data and the inherent characteristics of the fixed length restrictions.

The suppression changes dynamically based on the data that is being communicated. In addition, protocols such as HDLC can be significantly optimized such that flags will synchronize or line-up such that they are compressed out. Similarly, idle frames (or idle periods between frames) or silence will readily be compressed.

Figure 4:
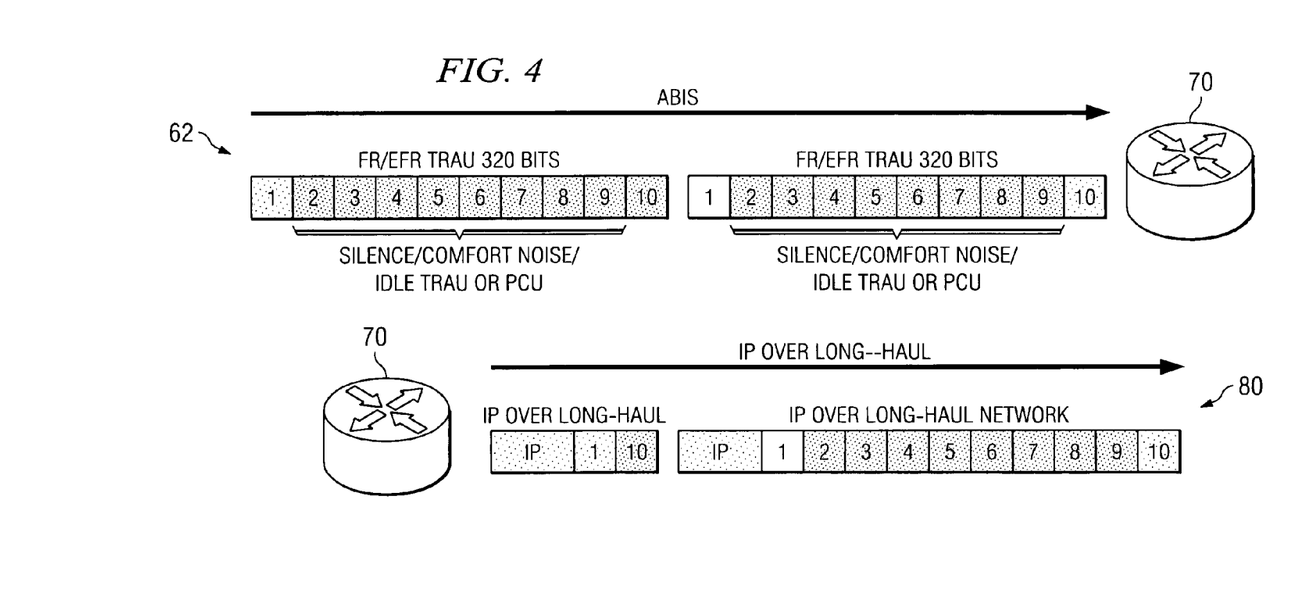
FIG. 4 is a simplified schematic diagram of an example backhaul scenario associated with the communication system.

FIG. 4 is a simplified block diagram of an example that illustrates some of the concepts that have been discussed above. It should be emphasized that such an illustration is only a logical view of the present invention. Specifically, a single TRAU frame is generally not sent in the same IP backhaul packet, as FIG. 4 suggests. FIG. 4 has only been offered for purposes of teaching and discussion. Indicated generally at 62 are two TRAU frames being received by a router 70 (or a switch, a gateway, etc.), which is located on the base station controller side of the network. These represent the standard 320-bit frames that are coming into the system. Within the frames are the samples that were described previously. The first of these TRAU frames that is being received by router 70 is indicative of the whole sample, which should be sent unchanged (as it is the first sample).

This first sample is stored by router 70 and then the second of these TRAU frames is received by router 70. Now two samples can be compared (i.e. samples from one frame can be compared to samples from a previous frame). In this example, samples 2-9 are the same and, hence, do not have to be transmitted on the backhaul. An IP over long-haul element 80 is provided that illustrates how the data is actually transmitted across the backhaul. As identified earlier, the first TRAU frame is still transmitted over the backhaul. However, the second TRAU frame is handled differently, as the algorithm of the present invention can readily identify this opportunity for suppression/compression. In the second packet that is being sent, samples 2-9 are not included. Only samples 1 and 10 are being sent in the second packet because only those samples are different between the two packets.

Hence, when samples between two frames are different, then the samples are included in the packet and sent across the backhaul. When samples are the same, then there is no need to send them over the backhaul. The repeating samples only need to be played back and not transmitted over the backhaul. Stated in anther way, only the "deltas" are transmitted over the backhaul. The delta reflects the difference in a comparison of the bits that would be in the same position of the previous frame.

It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 4, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, compression, and suppression techniques. In addition, any of the described elements may be provided as separate external components to communication system 10 or to each other where appropriate. The present invention contemplates great flexibility in the arrangement of these elements as well as their internal components.

Additionally, there are options for configuring compression determination module 38 differently, based on the vendor traffic that is expected. Note also that there are significant opportunities for additional compression that can be achieved in the upstream direction, as highlighted herein in this document.

In addition, although the preceding description offers a suppression protocol to be implemented with particular devices (e.g., aggregation node 22 and cell site element 18), the compression/suppression protocol provided may be embodied in a fabricated module that is designed specifically for effectuating the techniques discussed above. Moreover, such a module may be compatible with any appropriate protocol, other than those discussed herein, which were offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for communicating data, comprising:
a cell site element associated with a base transceiver station and comprising:
a compression determination module that is configured to:
receive a plurality of frames comprising a plurality of bits associated with a communications flow,
identify at least two samples of at least two frames for which at least two current bits at a plurality of bit positions of a current sample of a current frame of the flow are the same as at least two previous bits at the same bit positions of a previous sample of a previous frame,
in response to the identification, determine that the similar bits of at least one of the identified samples should be suppressed, and
convert the similar bits to a series of 1 bits to indicate to a suppression element that the bits are designated for subsequent suppression, the suppression element configured to suppress the designated bits.

2. The apparatus of claim 1, wherein the cell site element includes the suppression element that is operable to perform the suppression and positioning operations for the bits and to interface with the compression determination module, the suppression element being operable to identify the 1 bits as being indicative of silence such that data within a corresponding frame is not completely analyzed.

3. The apparatus of claim 1, wherein the compression determination module is operable to analyze control bits in order to determine whether or not the samples should be suppressed.

4. The apparatus of claim 1, wherein the compression determination module is operable to divide the bits and to position the bits into samples to be delivered.

5. The apparatus of claim 1, wherein the cell site element is further operable to position unique samples that are included in the flow in a super-frame to be communicated to a next destination.

6. The apparatus of claim 5, wherein the unique samples may be received and evaluated in order to restore a plurality of bits associated with the communications flow.

7. The apparatus of claim 5, further comprising:
an aggregation node associated with a base station controller and operable to communicate with the cell site element and to receive the super-frame.

8. The apparatus of claim 1, wherein the selected samples reflect silence data segments.

9. The apparatus of claim 1, wherein the compression determination module is a field programmable gate array (FPGA).

10. A method for communicating data, comprising:
receiving a plurality of frames comprising a plurality of bits associated with a communications flow;
identifying at least two samples of at least two frames for which at least two current bits at a plurality of bit positions of a current sample of a current frame of the flow are the same as at least two previous bits at the same bit positions of a previous sample of a previous frame;
in response to the identification, determining that the similar bits of at least one of the identified samples should be suppressed; and
converting the similar bits to a series of 1 bits to indicate to a suppression element that the bits are designated for subsequent suppression, the suppression element configured to suppress the designated bits.

11. The method of claim 10, further comprising:
identifying the 1 bits as being indicative of silence such that data within a corresponding frame is not completely analyzed.

12. The method of claim 10, further comprising:
analyzing control bits in order to determine whether or not the samples should be suppressed.

13. The method of claim 10, further comprising:
dividing the bits; and
positioning the bits into samples to be delivered.

14. The method of claim 10, further comprising:
positioning unique samples that are included in the flow in a super-frame to be communicated to a next destination.

15. The method of claim 14, further comprising:
receiving the unique samples; and
evaluating the unique samples in order to restore a plurality of bits associated with the communications flow.

16. A computer readable medium encoded with software for communicating data, the software comprising computer code such that when executed is operable to:
receive a plurality of frames comprising a plurality of bits associated with a communications flow;
identify at least two samples of at least two frames for which at least two current bits at a plurality of bit positions of a current sample of a current frame of the flow are the same as at least two previous bits at the same bit positions of a previous sample of a previous frame;
in response to the identification, determine that the similar bits of at least one of the identified samples should be suppressed; and
convert the similar bits to a series of 1 bits to indicate to a suppression element that the bits are designated for subsequent suppression, the suppression element configured to suppress the designated bits.

17. The medium of claim 16, wherein the code is further operable to:
identify the 1 bits as being indicative of silence such that data within a corresponding frame is not completely analyzed.

18. The medium of claim 16, wherein the code is further operable to:
analyze control bits in order to determine whether or not the samples should be suppressed.

19. The medium of claim 16, wherein the code is further operable to:
divide the bits; and
position the bits into samples to be delivered.

20. A system for communicating data, comprising:
means for receiving a plurality of frames comprising a plurality of bits associated with a communications flow;
means for identifying at least two samples of at least two frames for which at least two current bits at a plurality of bit positions of a current sample of a current frame of the flow are the same as at least two previous bits at the same bit positions of a previous sample of a previous frame;
means for determining in response to the identification that the similar bits of at least one of the identified samples should be suppressed;
means for converting the similar bits to a series of 1 bits to indicate to a suppression element that the bits are designated for subsequent suppression, the suppression element configured to suppress the designated bits.

21. The system of claim 20, further comprising:
means for identifying the 1 bits as being indicative of silence such that data within a corresponding frame is not completely analyzed.

22. The system of claim 20, further comprising:
means for analyzing control bits in order to determine whether or not the samples should be suppressed.

23. The system of claim 20, further comprising:
means for dividing the bits; and
means for positioning the bits into samples to be delivered.

24. The system of claim 20, further comprising:
means for positioning unique samples that are included in the flow in a super-frame to be communicated to a next destination.

25. The system of claim 24, further comprising:
means for receiving the unique samples; and
means for evaluating the unique samples in order to restore a plurality of bits associated with the communications flow.

* * * * *

UNITED STATES PATENT AND TRADEMARK OFFICE
CERTIFICATE OF CORRECTION

PATENT NO. : 7,642,936 B2  Page 1 of 1
APPLICATION NO. : 11/136187
DATED : January 5, 2010
INVENTOR(S) : Bales et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Sixteenth Day of November, 2010

David J. Kappos
*Director of the United States Patent and Trademark Office*